United States Patent Office 2,880,135
Patented Mar. 31, 1959

2,880,135

11-KETO-PROGESTERONE COMPOSITIONS AND METHODS OF TREATING KETOSIS THEREWITH

Samuel H. Eppstein, Kalamazoo, Mich., assignor to The Upjohn Company, Kalamazoo, Mich., a corporation of Michigan No Drawing. Application October 30, 1952
Serial No. 317,821

5 Claims. (Cl. 167—53)

This invention relates to therapeutic compositions. More particularly, it relates to compositions which are effective in the treatment of ketosis.

"Acetonemia" is the presence of large amounts of acetone bodies in the blood, and "ketosis" is a condition in which ketones are present in the body in excessive number. The incidence of such diseases, especially acetonemia, in milk cattle is of great economic importance. According to Tyznik et al., N. Am. Vet. 33:242 (April 1952), "Acetonemia often causes a fifty percent or more decrease in milk production. In some herds as many as fifteen percent, and occasionally even forty percent, of the cows suffer one or more attacks. All ages are susceptible, but acetonemia or clinical ketosis is limited primarily to cows in advanced pregnancy or in lactation." These diseases have also proved to be a serious problem in other domestic animals, e.g., sheep.

It is an object of this invention to provide a method for favorably affecting the physiological processes of milk-producing animals. Another object is to provide a method for, and compositions which are effective in, the treatment of ketosis. Still another object is to provide a method for increasing the overall milk production in dairy cattle. Other objects of the invention will be apparent to one skilled in the art to which the invention pertains.

The foregoing and additional objects have been accomplished by the provision of novel 11-ketoprogesterone compositions, including such compositions for both oral and parenteral use. This invention also provides a novel method for treating animals, especially milk-producing animals, which suffer from ketosis or acetonemia.

The active ingredient of the novel compositions of the present invention is 11-ketoprogesterone, otherwise identified as 4-pregnene-3,11,20-trione, which has the following structural formula:

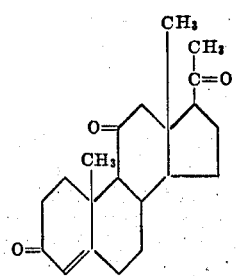

It has now been found that these 11-ketoprogresterone compositions have unexpected and unobvious properties of great value in treating ketosis. 11-ketoprogesterone is a compound known in the literature as early as 1940 [Helv. Chim. Acta, 23, 684 (1940)]. Peterson and Murray, J. Am. Chem. Soc., 74, 1892 (1952), have recently discovered a new and economical method for preparing 11-ketoprogesterone in sizable quantities, which process is more fully described in U.S. Patent No. 2,602,769, issued July 8, 1952.

According to the present invention, 11-ketoprogesterone is associated with a carrier which can be either a solid material or a sterile parenteral liquid. The compositions can take the form of tablets, powders, capsules, pills, or other dosage forms which are particularly useful for oral administration or for pellet implantation. Liquid diluents are employed for oral use or in sterile condition for parenteral use, that is, by injection. The compositions can take the form of active material, namely, 11-ketoprogesterone, admixed with solid diluents and/or tableting adjuvants such as cornstarch, lactose, talc, stearic acid, magnesium stearate, gums, or the like. Any of the usual tableting materials used in pharmaceutical practice can be employed where there is no incompatibility with 11-ketoprogesterone. The material can be tableted with or without coactive materials. Alternatively the 11-ketoprogesterone with its adjuvant material can be placed in the usual capsule of resorbable material such as the usual gelatin capsule and administered in that form. In yet another embodiment, the 11-ketoprogesterone compositions can be put into powder packets with a diluent. Or the 11-ketoprogesterone compositions can be prepared in the form of a suspension in a material in which the 11-ketoprogesterone is not soluble, for example, water or a non-toxic glyceride oil which is suitable for parenteral administration, such as peanut, cottonseed, corn, or sesame oil, or the 11-ketoprogesterone can be combined in some suitable manner with animal feeds of various kinds, e.g., grain, corn and cob meal, soybean meal, alfalfa, various other fodders, and the like. In short 11-ketoprogesterone can be dispersed in any nontoxic medium. The word "dispersion" is used here in the same sense as in Remington's Practice of Pharmacy, 10th ed., Mack Publishing Company (1951), a standard work in the field of pharmacy, at page 175, where it is defined as a generic term covering mixtures or suspensions, colloidal solutions, and true solutions.

The percentage of 11-ketoprogesterone in the compositions of the present invention can be varied considerably within the range of 0.034 percent to greater than fifty percent, e.g., seventy percent. Below 0.034 percent, the valuable characteristics of the compositions of the present invention are not exhibited to any useful extent. It is, of course, necessary in all cases that the active ingredient constitute a proportion such that a suitable dosage will be obtained consistent with the dosage form employed. Obviously several unit dosage forms may be administered at about the same time. When administered orally, as in admixture with normal animal foodstuffs, as low as 0.034 percent may be used effectively, although for such method of administration compositions containing above about 0.15 percent of 11-ketoprogesterone are preferred, especially from about 0.15 to about thirty percent. When in the form of tablets, as high as seventy percent of 11-ketoprogesterone may be used, preferably from twenty to fifty percent, and the highest single dose preferably does not exceed ten grams of active ingredient. Similarly, sterile liquid preparations containing from about 2.5 percent to about thirty percent, preferably from about 5.0 to about twenty percent, of 11-ketoprogesterone have been found to be most effective for parenteral use. The lower limit, in all cases above 0.034 percent, is dependent upon the maximum amount of sterile solution which can practically be given parenterally, and the upper limit is dependent upon the maximum obtainable concentration of active ingredient which can be associated with a liquid diluent and still be administered parenterally. Expressed in terms of weight, the particular animal feed selected may contain from about 1.25 to about ten grams of 11-ketoprogesterone, preferably about five grams, per 6.5 pounds of animal feed, or per meal, or per normal feed ration. For oral administration, the total amount of 11-ketoprogesterone required for complete treatment of ketosis in the form of the compositions of the present invention ordinarily does not exceed fifteen grams. For parenteral administration, the total requirement is usually no more than three grams.

The following examples are illustrative of the compositions and method of this invention but are not to be construed as limiting.

*Example 1.—Oral use*

Five grams of powdered 11-ketoprogesterone was mixed with one pound of soya bean meal having a 44 percent protein content and five pounds of corn and cob meal. One-half pound of molasses was added to bring the mixture to the proper consistency and make it more taste appealing. This feed mixture comprises about 0.17 percent of 11-ketoprogesterone.

Two cows, which had dropped noticeably in milk production and evidenced lack of appetite some eight to ten weeks after freshening, were given the potassium ferricyanide test for ketone bodies in the urine. The test was positive, coloring the urine a deep red to purple. One meal of grain and concentrate, similar to that shown in the preceding paragraph but containing only one gram of 11-ketoprogesterone in admixture therewith (approximately 0.034 percent) was given to each cow. No immediate response was evident in milk production or appetite. Tests 36 hours after administration still showed some color. The dosage was then increased. One cow was given two grams (approximately 0.068 percent) of 11-ketoprogesterone mixed with one meal of grain and concentrate, and the other, three grams (approximately 0.102 percent). Both picked up in appetite and milk production and the 36-hour test showed almost clear. However, the increase in milk production did not return production to its former level. Another 36-hour test was still positive in the case of both cows. The dosage was increased to five grams (the mixture described above, approximately 0.17 percent). At the end of 36 hours, the test was negative. Milk production increased almost up to the pre-ketosis level. Two more 36-hour tests showed negative.

*Example 2.—Parenteral use*

For parenteral use, 11-ketoprogesterone has been successfully suspended in a sterile aqueous solution in several different proportions. The following formulations represent proportions of ingredients prepared in one-liter amounts. The figures shown indicate contents of each milliliter thus-prepared.

Formulation I (10 percent):
  Each milliliter contains—
    11-ketoprogesterone _____ 100 milligrams.
    Sterile solution A _____ Q.s. one milliliter.
Solution A:
  Benzyl alcohol, National Formulary _____ 1.5 percent w./v.
  Sodium chloride, granular analytical reagent _____ 0.9 percent w./v.
  Sodium carboxymethylcellulose, low viscosity _____ 0.5 percent w./v.
  Polysorbate 80, United States Pharmacopoeia _____ 0.4 percent w./v.
  Water for injection _____ Q.s. 100 percent v./v.
Formulation II (20 percent):
  Each milliliter contains—
    11-ketoprogesterone _____ 200 milligrams.
    Sterile solution A _____ Q.s. one milliliter.
Formulation III (5.0 percent):
  Each milliliter contains—
    11-ketoprogesterone _____ 50 milligrams.
    Sterile solution A _____ Q.s. one milliliter.
Formulation IV (2.5 percent):
  Each milliliter contains—
    11-ketoprogesterone _____ 25 milligrams.
    Sterile solution A _____ Q.s. one milliliter.

In the above formulations, "w./v." is equivalent to the weight in grams in 100 milliliters of solution and "q.s." is an abbreviation for the Latin "quantum sufficit" and means a quantity sufficient to make up the total volume indicated.

Formulation I (ten percent solution) was used for the treatment of ten cases of acetonemia. It was administered subcutaneously in quantities sufficient to provide dosages of one, two, and three grams of 11-ketoprogesterone.

A. The first case involved a five year old purebred Guernsey cow which, one week after calving, was off feed, staggering, losing weight and down in milk production. The Ross test [Roephe, J. Amer. Vet. Med. Assn., 100, 411 (1942)], a test for acetone bodies in the urine, indicated a diagnosis of acetonemia. Dextrose, 500 milliliters of fifty percent solution, was administered intravenously and one ounce of chloral hydrate was given per os. Two days later the condition had not improved. Ten milliliters of Formulation I were given subcutaneously in the afternoon and another ten milliliters the next morning. Improvement was noticed immediately. The appetite and milk production increased and recovery was uneventful.

B. The second case involved a four year grade Guernsey cow which calved normally. Ten days later the cow was "flat-sided," losing weight, and down in milk production. Anorexia was present. The cow was given twenty milliliters of Formulation I subcutaneously and another ten milliliters 24 hours later. On the fourth day after treatment, the cow was eating normally and gaining but, because of a still slightly positive Ross test, an additional 500 milliliters of forty percent dextrose was given intravenously. The animal recovered without further treatment.

C. The third case involved a seven year grade Guernsey cow which calved normally, but which was staggering and had complete anorexia three days later. The Ross test was positive for ketone bodies. This animal was given twenty milliliters of Formulation I. On the next day, the animal appeared normal and was eating. No further treatment was given, and the cow remained normal for the next three months of observation.

D. In the fourth case, a five year grade Jersey cow which had freshened six days previous showed complete anorexia, stiffness, and a positive Ross test. Ten milliliters of Formulation I was injected subcutaneously. The cow showed immediate improvement and ate well on the next day. Two and one-half months later the cow was still normal.

E. In the fifth case, a four year grade Jersey cow was off feed, staggering, had an arched back, and showed a positive Ross test three days after calving. Five hundred milliliters of forty percent dextrose and two ounces of chloral hydrate were administered, whereafter the animal improved but relapsed five days later. At this time, the animal was dull, milk production was suspended, and the Ross test was highly positive. Twenty milliliters of Formulation I was given subcutaneously. Improvement was noticed in 24 hours and the animal was in good condition upon observation ten days later.

F. In the sixth case, a four year purebred Jersey cow went off feed and off milk six weeks after calving. The Ross test of the urine was positive for ketones. Twenty milliliters of Formulation I was injected subcutaneously. Improvement was noticed the next day, and the cow was normal when checked one week later.

G. The seventh case involved a three year old grade Jersey cow which had calved three weeks earlier and suddenly went off feed and milk. Prior to treatment, the cow was extremely nervous and had clonic spasms of the muscles of the jaw and neck. Salivation was present. The cow presented an extreme case of nervous acetonemia resembling rabies. The Ross test was positive. Twenty milliliters of Formulation I were injected subcutaneously. When observed the next morning, the cow was absolutely normal and has remained so.

H. The eighth case involved a five year grade Jersey cow which showed typical symptoms of acetonemea two and one-half weeks after calving. The animal was given twenty milliliters of Formulation I on the first day of treatment and ten milliliters on the following day. Improvement was noticed immediately after treatment and recovery was complete one week later.

I. The ninth case involved a six year grade Jersey cow which was staggering, off feed and down on milk production three weeks after calving. The cow was given twenty milliliters of Formulation I by subcutaneous injection on the first day of treatment and ten milliliters on the succeeding day. On the third day, 500 milliliters of 49 percent dextrose was injected intravenously. No further treatment was necessary.

J. The tenth case involved a grade Jersey cow, five years of age, which had typical symptoms of acetonemia three weeks after calving. The animal was given ten milliliters of Formulation I on the first day of treatment and twenty milliliters on the second day. Improvement was noticed immediately, and the animal recovered promptly without further treatment.

K. Similar cases, in which the treatment involved use of Formulations II, III and IV, showed similar results, although recovery was somewhat slower with the last two formulations.

The results of the foregoing cases may be summarized as follows: Six cows suffering from acetonemia were treated with a ten percent 11-ketoprogesterone composition by subcutaneous administration and recovered without further treatment. Two cows suffering from acetonemia were successfully treated with an 11-ketoprogesterone composition by subcutaneous administration after dextrose and chloral hydrate treatment did not effect a complete cure. In the remaining two cases of acetonemia, dextrose was given immediately after subcutaneous treatment with an 11-ketoprogesterone composition, as an adjunct thereto, and recovery was complete. In all of the cases noted, treatment with the 11-ketoprogesterone compositions of the present invention offered rapid and complete cure for acetonemia. Use of formulations containing other percentages of 11-ketoprogesterone produced similar recovery.

Another group of clinical trials involved five cases of acetonemia in cows. The group included cows ranging in age from three to eight years. Symptoms occurred from one to four weeks after calving. Symptoms included emaciation, anorexia, stilted gait, listlessness, and very low milk production. Three cases gave a positive Ross test; two gave a negative Ross test. All were treated subcutaneously. One was given formulations containing four grams of 11-ketoprogesterone in two equally divided doses given four days apart. Two were given a formulation containing two grams of 11-ketoprogesterone. The two cases showing a negative Ross test were given a formulation containing one gram of 11-ketoprogesterone. All recovered rapidly and completely. Recovery was characterized by increase in milk production, return of appetite, gain in weight, greater activity, and the return of general good health.

Additional investigations have been carried out with other novel 11-ketoprogesterone compositions which confirm and establish results shown in Examples 1 and 2 with respect to the activity of the novel 11-ketoprogesterone compositions. Examples 3, 4, and 5 illustrate other such compositions.

*Example 3.—Oral use (ca. 32 percent)*

(1) 11-ketoprogesterone _____milligrams__ 200
(2) Lactose _____grains__ 6
(3) Sucrose (as 25 percent syrup) _____do____ 0.28
(4) Starch, Bolted _____do____ 0.25
(5) Calcium stearate _____do____ 0.05

Fine powders of 1 and 2 were mixed and then granulated with 3, whereafter 4 and 5 were added and the mixture then compressed into tablets. The resulting tablets were clinically evaluated and proved to be an effective mode of formulating and orally administering 11-ketoprogesterone.

*Example 4.—Oral use (ca. 52 percent)*

(1) 11-ketoprogesterone _____milligrams__ 500
(2) Lactose _____grains__ 6
(3) Sucrose (as 25 percent syrup) _____do____ 0.49
(4) Starch _____do____ 0.6
(5) Calcium stearate _____do____ 0.1

Individual tablets containing the above ingredients were prepared in the manner disclosed in Example 3 and gave similar clinical results.

*Example 5.—Oral use (ca. 50 percent)*

(1) 11-ketoprogesterone _____milligrams__ 300
(2) Placebo granules _____do____ 275
(3) Stearic acid _____do____ 15
(4) Talc _____do____ 10

The placebo granules consisted of:

Cornstarch _____percent__ 40
Lactose _____do____ 60

Individual tablets containing the above ingredients were prepared in a manner similar to that shown in Example 3 and gave similar clinical results.

It is to be understood that the invention is not to be limited to the exact details of operation or exact compositions shown and described as obvious modifications and equivalents will be apparent to one skilled in the art, and the invention is therefore to be limited only by the scope of the appended claims.

I claim:

1. A method for the treatment of ketosis in animals comprising the step of administering to the animal a composition containing from about 0.034 to about seventy percent of 11-ketoprogesterone in a nontoxic dispersion medium.

2. A method for the oral treatment of acetonemia in milk-producing animals comprising the step of adding from about 1.25 to about ten grams of 11-ketoprogesterone to their normal feed ration.

3. A veterinary feed effective in the treatment of ketosis comprising from about 0.034 to about thirty percent of 11-ketoprogesterone and an animal food carrier.

4. An injectable therapeutic composition effective in the treatment of ketosis comprising from about 2.5 to about thirty percent of 11-ketoprogesterone and a sterile injectable diluent.

5. A composition in unit dosage form effective in the treatment of ketosis comprising from about 200 milligrams to about fifteen grams of 11-ketoprogesterone per dosage unit and a pharmaceutically acceptable carrier.

References Cited in the file of this patent

UNITED STATES PATENTS 2,403,683   Riechstein _____ July 9, 1946
2,589,898   Turner _____ Mar. 18, 1952

OTHER REFERENCES

Shaw et al.: Science, vol. 114, November 30, 1943, pp. 574–76.

Shaw: Journal of Dairy Science, vol. 29, 1946, pp. 151–155.